Patented Oct. 10, 1944

2,360,039

UNITED STATES PATENT OFFICE 2,360,039

REFINING VITAMIN-CONTAINING MATERIALS

Loran O. Buxton, Belleville, N. J., assignor to National Oil Products Company, Harrison, N. J., a corporation of New Jersey No Drawing. Application August 28, 1941, Serial No. 408,622

9 Claims. (Cl. 260—398.5)

This invention relates to the refining of vitamin A and D-containing materials, more particularly to the refining of vitamin-containing fish oils and concentrates prepared therefrom.

As is well known in the art, vitamin A or D-containing materials, such as, for example, fish oils and concentrates prepared therefrom, have a wide variety of uses in the nutritional fields. However, many of these products, especially those of a fish origin, have characteristic odors and tastes which render them somewhat unpalatable to the consumer. Another undesirable property of these materials is that they tend to be somewhat unstable when exposed to oxidizing influences. These undesirable properties of such materials have in some cases tended to limit their field of usefulness, so that there is a demand for a simple and effective method for producing such materials free of these objectionable features.

It is an object of this invention to provide an efficient means of refining and stabilizing vitamin-containing materials of fish origin.

It is a more specific object of this invention to provide an improved process for refining and stabilizing fish oils and fish liver oils.

I have discovered that vitamin-containing materials of fish origin may be very efficiently refined and stabilized against oxidative changes merely by contacting such materials with a dried milk product in the presence of a solvent for the vitamin-containing material. The dried milk product adsorbs undesirable color, taste and odor constituents from the vitamin-containing material. Furthermore, the combined action of the vitamin-containing material and the solvent therefor permits the recovery from the dried milk product of all of the desirable flavor and antioxidant constituents compatible with said material without introducing substances of an incompatible nature into the refined product. The refined product which is obtained upon filtering and removing the solvent will be substantially completely devoid of fishiness, possess a characteristic milk-flavored taste, and be more stable towards oxidative changes than the original oil. Such products are suitable for a wide variety of uses in the nutritional field.

The vitamin-containing materials which may be treated in accordance with my invention may be any such material of fish origin from which it is desired to remove objectionable odor or taste, or to which it is desired to impart increased stability. Thus, for example, fish liver oils such as cod liver oil, shark liver oil, sword fish liver oil, ling cod liver oil, halibut liver oil, and the like, fish body oils, such as sardine oil, herring oil, etc. may all be treated as well as vitamin concentrates prepared from fish liver oils or fish body oils by saponification of the oils and extraction of the unsaponifiable fraction therefrom. Furthermore, highly potent fractions prepared by high vacuum distillation of the oils may be treated with advantage; other highly potent products prepared by solvent extraction of the fish oils or by similar methods designed to produce a fraction having the vitamin potency concentrated therein may also be treated.

Dried milk products which may be employed in the practice of the invention include, inter alia, dried skim milk, dried butter milk dried powdered cheese, milk powder, dried milk whey, etc. The expression "dried milk product" is used herein to generically connote these and similar dry products of milk origin, i. e. milk produced by cows, goats, etc. If desired, an adsorbent, such as an activated carbon or an activated earth, may be used in conjunction with the dried milk product in order to assist in the removal of the objectionable odor, taste and color-forming constituents. It is advantageous to substantially completely deaerate the dried milk product before it is employed in the practice of my invention in order to minimize oxidation of the vitamins during the refining process; this deaeration may be advantageously carried out by agitating the dried milk product with the solvent to be employed until any entrapped air has been driven from the dried milk product.

The solvent employed in the practice of this invention should be one in which the vitamin-containing material to be refined is readily soluble. Thus hydrocarbon or halogenated hydrocarbon solvents such as hexane, heptane, octane, ethylene dichloride, trichloroethylene, carbon tetrachloride, cyclohexane, methyl cyclohexane or benzene may be used, as well as solvents such as acetone, diacetone alcohol and the like.

The process of my invention may be carried out in a variety of ways. The vitamin-containing material, the dried milk product and the solvent may be mixed and the mixture then agitated thoroughly. If desired, the vitamin-containing material may be dissolved in the solvent therefor and the dried milk product then added to the solution. Alternatively, the dried milk product may be first agitated with the solvent before the addition of the vitamin-containing material, in order that the antioxidants contained in the dried milk product may be extracted by the solvent and thus made more readily available to the fatty material subsequently added. The particular amounts of the ingredients incorporated in the mixture may vary widely, but generally it is most suitable to employ between about 5 and about 120 or more parts of a dried milk product per 100 parts of vitamin-containing material; the amount of solvent employed should be at least equivalent to, and preferably somewhat in excess of, the amount of material being refined. The process may be carried out at room temperature, or elevated temperatures may be employed. After the mixture has been thoroughly agitated for between about ½ and about 3 hours, the dried milk product may be removed by filtration, centrifugation or other suitable means and the refined material recovered by evaporation of the solvent.

In accordance with the preferred embodiment of my invention, a vitamin A and/or D-containing material of fish origin is refined by contact with a dried milk product in the presence of a hydrocarbon or halogenated hydrocarbon solvent. This is preferably carried out by mixing the solvent with the dried milk product, refluxing the mass in an inert atmosphere for a short while in order to release the antioxidants present in the dried milk product, adding the vitamin-containing material to be refined and then agitating the mixture for the desired length of time in an inert atmosphere, preferably under reflux conditions or at least at somewhat elevated temperatures. After cooling, the dried milk product may be removed by filtration and the refined vitamin-containing material recovered by evaporation of the solvent. Products produced by this procedure have proved to be superior in many respects to vitamin A or D-containing materials at present available. The refining treatment removes any undesirable tastes and odors which are associated with the vitamin material, thus giving a product which is readily and easily ingested. Furthermore, the stability of the vitamin-containing material is greatly improved, and by reason of the cooperative solvent action of the vitamin material and solvent used, the antioxidants transferred from the dried milk product to the vitamin-containing material are completely compatible therewith. Also the refined vitamin-containing materials possess a characteristic milk-flavored taste; this and their other advantages makes them particularly adaptable for fortifying milk and similar products, and products such as margarine, shortenings, etc.

For a fuller understanding of the nature and objects of the invention, reference should be had to the following examples which are given merely to further illustrate the invention and are not to be construed in a limiting sense, all parts given being by weight.

Example I 5 parts of dried milk whey were weighed in a flask and 125 parts of ethylene dichloride added. The mixture was refluxed for 5 minutes and while stirring 25 parts of crude swordfish liver oil containing 170,000 units of vitamin A/gm. were added and the mixture stirred for one hour. The refined oil after filtering and removing the solvent was odorless and possessed a characteristic milk-flavored taste, and was more stable than the original oil.

Example II 10 parts of powdered whole milk were mixed with 100 parts of hexane and the mixture heated at 50° C. in the presence of N₂ gas for 5 minutes. 100 parts of shark liver oil containing 103,000 units of vitamin A/gm. and possessing a fishy taste and odor were added and the mixture agitated at about 50° C. in the presence of N₂ gas for 1 hour. The mixture was then cooled to room temperature, filtered and the solvent removed. The resulting oil was devoid of fishiness and was more resistant to oxidation than the untreated oil, as is shown by the following stability data obtained by maintaining a sample of each oil at a temperature of about 34.5° C. in the presence of air for the indicated number of days, and then measuring the percentage of vitamin A destruction.

| Sample | Per cent vitamin A destruction after— | | |
| --- | --- | --- | --- |
|  | 6 days | 14 days | 20 days |
| Original oil | 19.0 | 41.0 | 67.0 |
| Treated oil | 8.7 | 17.0 | 33.0 |

Example III 20 parts of dried buttermilk were mixed with 5 parts of an activated carbon, "Nuchar XXX," and 200 parts of cyclohexane and the mixture agitated at 60° C. for 5 minutes in the presence of N₂ gas. 100 parts of halibut liver oil possessing a fishy taste and odor were added and the mixture agitated under the just described conditions for 30 minutes. After cooling to room temperature the mixture was filtered and the solvent removed under reduced pressure and in the presence of N₂ gas. The treated oil was free of the original fishy taste and odor and exhibited a pleasant odor characteristic of the dried buttermilk. The vitamin content was unchanged.

It will be noted from the above examples that the vitamin-containing oils refined by the process of my invention were more stable than the original oils; furthermore, all of these products had improved tastes and odors as compared to the original oil.

From the above description it will be evident that my invention provides a process for the production of refined and stabilized vitamin-containing materials of fish origin which is simpler and more effective than processes heretofore devised.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent, is:

1. A process for refining a vitamin-containing material of fish origin, which comprises contacting such a material selected from the group consisting of fish oils, fish liver oils and concentrates thereof with a dried milk product in the presence of a solvent for said vitamin-containing material, separating the dried milk product from the solvent solution of the vitamin-containing material and removing the solvent from the refined vitamin-containing material.

2. A process for refining a fish liver oil, which comprises contacting a fish liver oil with a dried milk product in the presence of a solvent for said oil, separating the dried milk product from the solvent solution of the oil and removing the solvent from the refined oil.

3. A process for refining a fish liver oil, which comprises contacting a fish liver oil with dried milk whey in the presence of a solvent for said oil, separating the dried milk whey from the solvent solution of the oil and removing the solvent from the refined oil.

4. A process for refining a fish liver oil, which comprises contacting a fish liver oil with buttermilk in the presence of a solvent for said oil, separating the buttermilk from the solvent solution of the oil and removing the solvent from the refined oil.

5. A process for refining a fish liver oil, which comprises contacting a fish liver oil with dried milk powder in the presence of a solvent for said oil, separating the dried milk powder from the solvent solution of the oil and removing the solvent from the refined oil.

6. A process for refining a vitamin-containing material of fish origin, which comprises contacting such a material selected from the group consisting of fish oils, fish liver oils and concentrates thereof with a dried milk product and activated carbon in the presence of a solvent for said vitamin containing material, separating the dried milk product and activated carbon from the solvent material and removing the solvent from the refined vitamin-containing material.

7. A process for refining a vitamin-containing material of fish origin, which comprises contacting such a material selected from the group consisting of fish oils, fish liver oils and concentrates thereof with a dried milk product and activated earth in the presence of a solvent for said vitamin containing material, separating the dried milk product and activated earth from the solvent material and removing the solvent from the refined vitamin-containing material.

8. A process for refining fish liver oils, which comprises mixing a solvent for fish liver oils with a dried milk product, deaerating the mixture, adding to said mixture the fish liver oil to be refined, agitating the mass, separating the dried milk product from the solvent solution of the oil and removing the solvent from the refined fish liver oil.

9. A process for refining fish liver oils, which comprises mixing a solvent for fish liver oils with a dried milk product, deaerating the mixture by refluxing the same, adding to said mixture the fish liver oil to be refined, agitating the mass, separating the dried milk product from the solvent solution of the oil and removing the solvent from the refined fish liver oil.

LORAN O. BUXTON.